United States Patent
Duan et al.

(10) Patent No.: US 10,029,323 B2
(45) Date of Patent: Jul. 24, 2018

(54) ADJUSTABLE WORK TABLE

(71) Applicant: Rikon Power Tools, Inc., Billerica, MA (US)

(72) Inventors: Wuzheng Duan, Qingdao Shandong (CN); Jiquan Jiang, Qingdao Shandong (CN)

(73) Assignee: Rikon Power Tools, Inc., Billerica, MI (US)

( * ) Notice: Subject to any disclaimer, the term of this patent is extended or adjusted under 35 U.S.C. 154(b) by 73 days.

(21) Appl. No.: 15/161,149

(22) Filed: May 20, 2016

(65) Prior Publication Data
US 2017/0106458 A1     Apr. 20, 2017

(30) Foreign Application Priority Data
Apr. 17, 2015 (CN) .................. 2015 2 0232837 U

(51) Int. Cl.
*B23D 53/06* (2006.01)
*B23D 55/02* (2006.01)

(52) U.S. Cl.
CPC .......... *B23D 53/06* (2013.01); *B23D 55/026* (2013.01)

(58) Field of Classification Search
CPC ............................ B23D 53/06; B23D 55/026
See application file for complete search history.

(56) References Cited

U.S. PATENT DOCUMENTS

| | | | | |
|---|---|---|---|---|
| 306,221 | A | * | 10/1884 | Cordesman ............ B23D 55/06 83/810 |
| 2,040,718 | A | * | 5/1936 | Tautz ................... B23D 55/026 83/648 |
| 2,162,848 | A | * | 6/1939 | Kulp ...................... B23D 53/06 451/226 |
| 2,274,923 | A | * | 3/1942 | Hedgpeth ............... B27B 13/06 83/810 |
| 2,695,637 | A | * | 11/1954 | Ocenasek .............. B23D 55/02 74/370 |
| 3,385,330 | A | * | 5/1968 | Haynes ................ B23D 53/045 83/581 |
| 4,373,414 | A | * | 2/1983 | Agius .................... B21D 53/42 269/56 |
| 4,487,523 | A | * | 12/1984 | Monroe ................... F16B 2/10 24/498 |
| 5,357,834 | A | * | 10/1994 | Ito ....................... B23D 45/044 83/471.3 |
| 5,363,733 | A | * | 11/1994 | Baird .................... B23D 51/14 403/DIG. 4 |
| 5,582,088 | A | * | 12/1996 | Harter .................. B23D 45/024 83/468.4 |
| 5,715,605 | A | * | 2/1998 | Nadeau .................. B26B 29/06 30/286 |
| 5,862,734 | A | * | 1/1999 | Brunson .............. B23D 45/048 83/471.3 |
| 6,123,004 | A | * | 9/2000 | Matz ..................... B26D 1/553 83/699.21 |

(Continued)

*Primary Examiner* — Sean Michalski
(74) *Attorney, Agent, or Firm* — Wolf, Greenfield & Sacks, P.C.

(57) ABSTRACT

Adjustable work tables and their methods of use are described. A work table tilt-adjustment system includes a tool-free locking mechanism movable between a locking configuration and an unlocked configuration to selectively permit adjustment of the tilt angle of the work table.

20 Claims, 4 Drawing Sheets

(56) References Cited

U.S. PATENT DOCUMENTS

| | | | | |
|---|---|---|---|---|
| 6,293,176 B1* | 9/2001 | Talesky | ............... | B23D 47/025 |
| | | | | 144/286.1 |
| 6,513,412 B2* | 2/2003 | Young | ............... | B23D 45/044 |
| | | | | 83/471.3 |
| 6,644,163 B2* | 11/2003 | Lee | ............... | B23D 55/026 |
| | | | | 83/581 |
| 7,201,090 B2* | 4/2007 | Svetlik | ............... | B23D 45/044 |
| | | | | 83/471.3 |
| 7,311,028 B2* | 12/2007 | Garcia | ............... | B23D 45/044 |
| | | | | 83/471.3 |
| 7,395,745 B2* | 7/2008 | Gehret | ............... | B23D 47/02 |
| | | | | 83/468.3 |
| 7,540,223 B2* | 6/2009 | Sasaki | ............... | B27G 19/02 |
| | | | | 83/102.1 |
| 7,845,260 B2* | 12/2010 | Terashima | ............... | B23D 45/048 |
| | | | | 83/471.3 |
| 7,861,633 B2* | 1/2011 | Talesky | ............... | B23D 45/048 |
| | | | | 83/471.3 |
| 9,662,724 B1* | 5/2017 | Knight | ............... | B23D 45/024 |
| 2006/0144207 A1* | 7/2006 | Nortmann | ............... | B23D 55/026 |
| | | | | 83/809 |
| 2007/0221032 A1* | 9/2007 | Mangano | ............... | B23D 55/026 |
| | | | | 83/810 |
| 2007/0295185 A1* | 12/2007 | Lin | ............... | B23D 55/026 |
| | | | | 83/810 |
| 2011/0005364 A1* | 1/2011 | Liu | ............... | B23D 55/026 |
| | | | | 83/810 |

* cited by examiner

ADJUSTABLE WORK TABLE

RELATED APPLICATIONS

This application claims foreign priority benefits under 35 U.S.C. § 119(a)-(d) or 35 U.S.C. § 365(b) of Chinese application number 201520232837, filed Apr. 17, 2015.

FIELD

Disclosed embodiments are related to adjustable tables for band saws or other cutting machines.

BACKGROUND

Sawing machines such as band saws include a work table that supports a work piece during a cutting operation. In some instances, the work table is adjustable relative to the blade to allow cutting a work piece at various angles. For example, the work table may be mounted to a housing of the band saw on a tilting mechanism that permits rotation of the work table about an axis parallel to a cutting direction of the blade, thereby allowing adjustment of the cutting angle.

SUMMARY

In one embodiment, a work table adjustment system comprises a tilt-adjustment mechanism that rotatably attaches a work table to a housing, and a locking mechanism comprising a rotatable cam and a tightening element. The locking element is movable between an unlocked configuration and a locking configuration, and the locking mechanism substantially restricts adjustment of the tilt-adjustment mechanism when the locking mechanism is in the locking configuration. Rotating the cam about a first axis applies tension to the tightening element along a second axis, the second axis perpendicular to the first axis, and applying tension to the tightening element moves the locking mechanism from the unlocked configuration to the locking configuration.

In another embodiment, a work table adjustment system for a band saw includes a tilt-adjustment mechanism comprising a first adjustment element attached to a housing of the bandsaw and a second adjustment element attached to a work table and movable relative to the first adjustment element. Moving the second adjustment element relative to the first adjustment element rotates the work table relative to the housing. The work table adjustment system further comprises a locking mechanism operatively coupled to the tilt-adjustment mechanism. The locking mechanism is movable between a locking configuration and an unlocked configuration, and the locking mechanism substantially restricts movement of the tilt-adjustment mechanism when the locking mechanism is in the locking configuration. The locking mechanism includes a tightening element displaceable relative to the housing, the tightening element operatively coupled to the tilt-adjustment mechanism, and a cam movable relative to the tightening element. Moving the cam relative to the tightening element displaces the tightening element relative to the housing to move the locking mechanism to the locking configuration.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
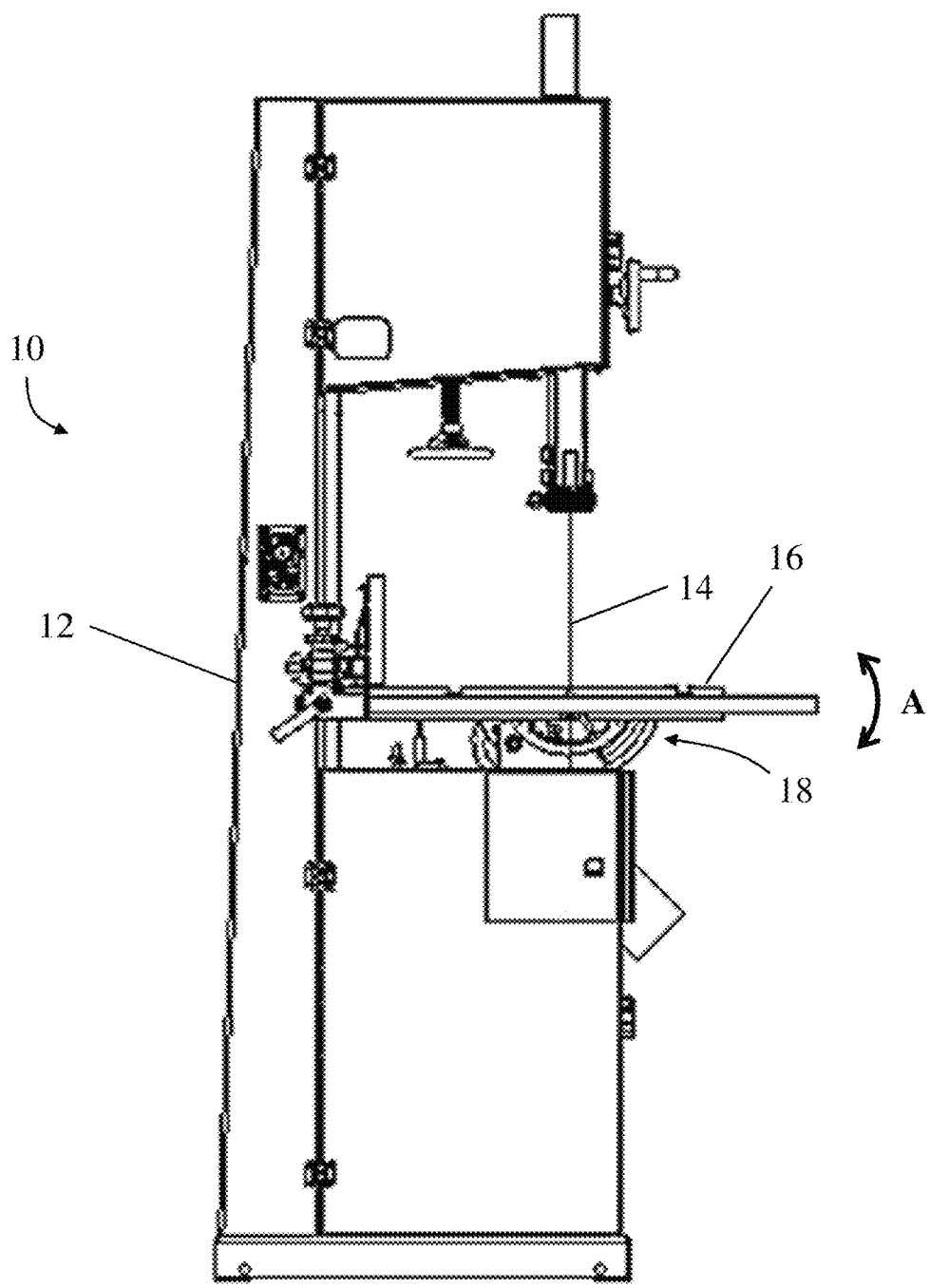
FIG. 1 is a front view of a bandsaw.
Figure 2:
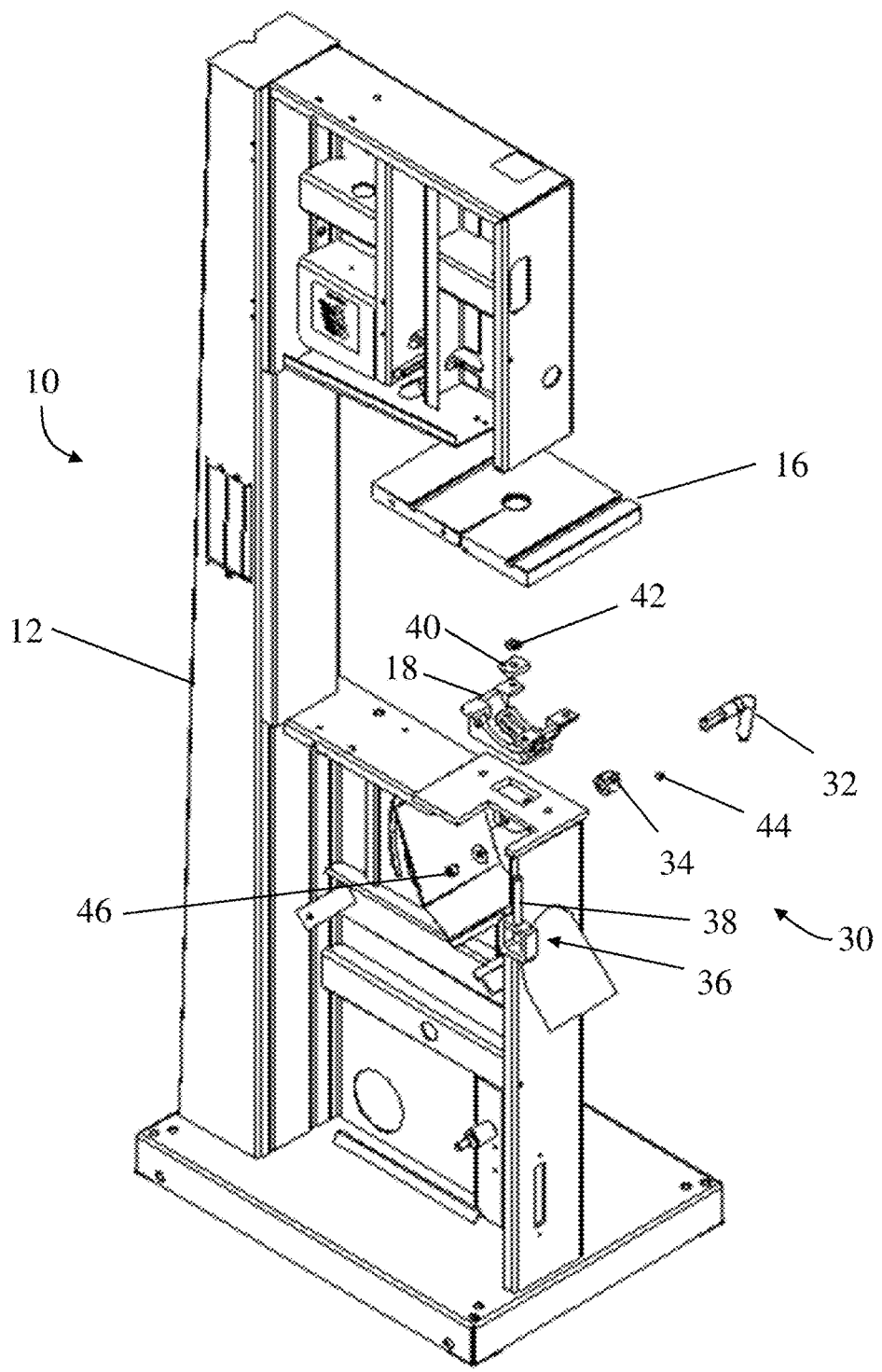
FIG. 2 is a partially-exploded perspective view of a bandsaw including a work table adjustment system according to some embodiments.

The inventors have recognized and appreciated that conventional systems for adjusting a tilt angle of a work table of a band saw or similar sawing machine may be difficult and/or time consuming to operate. For example, typical adjustment systems require a user to loosen one or more locking screws or bolts, which may require the use of additional or specialized tools, before adjusting the table to the desired orientation. Once in the desired position, the locking screws or bolts must be re-tightened to secure the work table in place. Other conventional adjustment systems include a locking screw with a knob or handle so that a user can loosen and/or tighten the locking screw by hand. However, these systems generally have lower locking forces compared to tool-tightened systems, and thus they are susceptible to loosening during use, which can affect the performance and/or accuracy of a cutting operation. In view of the above, the inventors have recognized numerous benefits associated with a tool-free tilt-adjustment system for a cutting machine which affords simple and fast locking/unlocking of the table to permit tilt adjustments, while also providing a high locking strength to aid in maintaining the work table in the desired orientation throughout a cutting process.

In some embodiments, a band saw (or other suitable cutting machine) includes a work table attached to a housing of the band saw via an adjustment system that allows a user to adjust an angle of the work table relative to the housing, and consequently, relative to the blade, which may have a fixed orientation relative to the housing. For example, the work table adjustment system may include a tilt-adjustment mechanism including a first adjustment element attached to the housing and a second adjustment element attached to the work table and rotatable relative to the first adjustment element. As discussed in more detail below, the first and second adjustment elements may include one or more trunnions, a rack and pinion arrangement, or any other suitable structure associated with the housing and the work table which permits angular adjustment of the work table relative to the housing. The work table adjustment system may further include a tool-free locking mechanism associated with the tilt-adjustment mechanism to selectively permit adjustment of the work table via the tilt-adjustment mechanism. As discussed in more detail below, the tool-free locking mechanism may be movable between a locking configuration and an unlocked configuration by manipulating a handle, and without requiring any additional and/or specialized tools. In the locking configuration, the locking mechanism may substantially prevent adjustment of the tilt-adjustment mechanism in order to retain the work table in a desired orientation, and the locking mechanism may provide a locking force that is larger than what is possible with conventional tool-free adjustment systems that utilize hand-tightened locking screws. In the unlocked configuration, an operator may adjust the work table to a desired orientation via the tilt-adjustment mechanism.

According to one aspect of the current disclosure, a locking mechanism associated with a tilt-adjustment mechanism may include a cam coupled to a locking handle, and a tightening element coupled to the tilt-adjustment mechanism. The cam may be arranged to engage a corresponding surface on the tightening element do drive displacement of the tightening element relative to the tilt-adjustment mechanism. For example, the cam and tightening element may be arranged such that movement (i.e., rotation and/or displacement) of the cam relative to the tightening element (e.g., by manipulating the locking handle) displaces the tightening element to move the locking mechanism between the unlocked and locking configurations. In some embodiments, the locking configuration may correspond to a frictional engagement between one or more components of the tilt-adjustment mechanism, and displacing the tightening element in a tightening direction may urge those components together to provide the required frictional engagement. When the locking mechanism is in the unlocked configuration, the frictional engagement is reduced to permit adjustment of the adjustment mechanism. In certain embodiments, the locking handle may act as a lever to provide a mechanical advantage when moving the cam relative to the tightening element. In this manner, the locking mechanism may be configured to provide a large locking force to secure the work table in a desired configuration without requiring tools to move the locking mechanism between the unlocked and locking configurations.

As noted above, the current disclosure is not limited to any particular type of tilt-adjustment mechanism for adjusting the angle of a work table relative to a housing of a band saw. For example, in some embodiments, the tilt-adjustment mechanism may include one or more trunnion-style adjustment mechanisms including a first trunnion (e.g., a base) fixed to the housing and a second trunnion fixed to the work table. The trunnions may have corresponding curved shapes that define a curved interface, and movement of the first and second trunnions relative to one another along the curved interface results in rotation of the work table relative to the housing. In other embodiments, the tilt-adjustment mechanism may include a rack and pinion arrangement including one or more curved racks attached to the work table that engage one or more corresponding pinion gears attached to the housing. Rotating the pinion gear(s), for instance, by manipulating a handle or knob associated with the pinon gear(s), may drive rotation of the work table to adjust the tilt angle. In certain embodiments, the tilt-adjustment mechanism may further include an indicator such as an inclinometer or other suitable gauge that indicates the tilt angle of the work table relative to the housing.

For the sake of clarity, the presently disclosed embodiments are directed to work table adjustment systems for band saws. However, the present disclosure is not limited to band saws. Instead the work table adjustment systems and associated locking mechanisms could be used with table saws, radial arm saws, chop saws, drill presses, routers and router tables, or any other suitable cutting and/or machining systems in which an adjustable work table may be included. Moreover, the work table adjustment system is not limited to use on cutting or machining systems. Rather, the adjustment systems and locking mechanisms may be used with any suitable system including a work table that has an adjustable inclination.

Turning now to the figures, specific non-limiting embodiments of work table adjustment systems and associated locking mechanisms are described in further detail. While specific embodiments are described below, it should be understood that the various components, systems, and methods of operation described herein may be combined in any suitable fashion as the current disclosure is not so limited.

FIGS. 1-4 depict one embodiment of a band saw 10 in which a work table adjustment system as described herein may be used. The band saw includes a housing 12, a continuous saw blade 14, and a work table 16 coupled to the housing via a work table tilt-adjustment mechanism 18. The tilt-adjustment mechanism is constructed and arranged to allow rotation of the work table along direction A to adjust the tilt angle of the work table 16 relative to the housing, and thus relative to the blade 14. In this manner, the work table can be oriented to provide a desired cutting angle during a cutting process.

Figure 3:
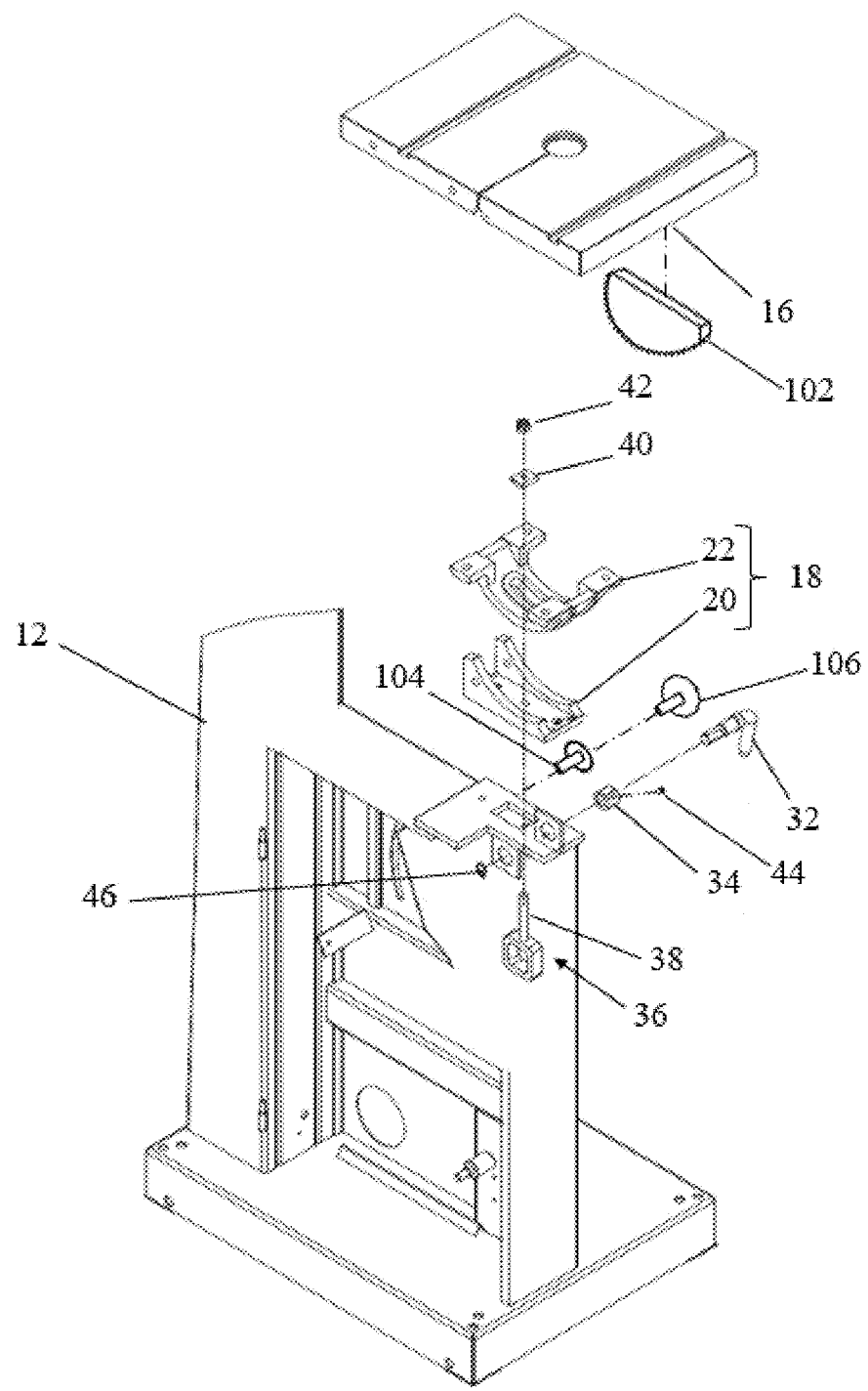
FIG. 3 is partially-exploded perspective view of a lower portion of a bandsaw including a work table adjustment system according to some embodiments.

In the depicted embodiment, as best shown in FIG. 3, the tilt-angle adjustment mechanism 18 includes a first trunnion 20 fixed to the housing 12 and a second trunnion 22 attached to the work table 16. The trunnions have corresponding curved shapes to define a curved interface. In particular, the second trunnion 22 cradles into, and is supported by, the first trunnion 20. In this manner, the trunnions permit rotation (i.e., tilting) of the work table relative to the housing via movement of the second trunnion 22 relative to the first trunnion 20 along the curved interface. Specifically, since the first trunnion 20 is secured to the housing 12 and the second trunnion 22 is secured to the work table 16, the second trunnion slides within the first trunnion along the curved interface as the work table rotates (i.e., tilts) relative to the housing. As noted above, and shown in FIG. 3, in other embodiments the tilt-angle adjustment mechanism may include a rack 102 attached to the work table, pinion gear 104 attached to the housing, and knob 106 coupled to the pinion gear, such that by rotating the knob, rotation of the work table to adjust the tilt angle may be achieved. Of course, any other suitable structure may be employed, as the disclosure is not limited to any particular type of tilt-adjustment mechanism. Although FIG. 3 shows the tilt-angle adjustment mechanism as including trunnions in combination with a rack and pinion gear arrangement, the tilt-adjustment mechanism, as noted above, is not limited to such a combination.

The band saw 10 further includes a locking mechanism 30 that selectively permits adjustment of the work table via the tilt-adjustment mechanism 18. In this manner, when the locking mechanism is locked, the work table 16 is maintained in a fixed, desired angle. When the locking mechanism is unlocked, the work table may be tilted to a new desired angle and then locked in place again. The locking mechanism includes a locking handle 32 having a camshaft 48 that is received through openings 24 in the housing 12, and an eccentric cam 34 is mounted on the camshaft. The locking handle and camshaft are secured to the housing by a screw 46, and the camshaft is rotatable relative to the housing by manipulating the locking handle 32. The locking mechanism further includes a tightening element 36 having an opening 52 that receives the cam and a rod 38 extending from the opening. The tightening element is displaceable along an axis extending through the rod; in the depicted embodiment, the tightening element is displaceable along a direction that is perpendicular to an axis extending through the camshaft 48. The rod 38 extends upwardly through openings in the in the tilt-adjustment mechanism 18 and a tightening block 40, and is secured in place by one or more locking nuts 42. In this manner, when the tightening element 36 is pulled downwardly away from the work table, it pulls on the tightening block 40, thereby squeezing the trunnions 20 and 22 together to lock the tilt-adjustment mechanism 18 in place.

Figure 4:
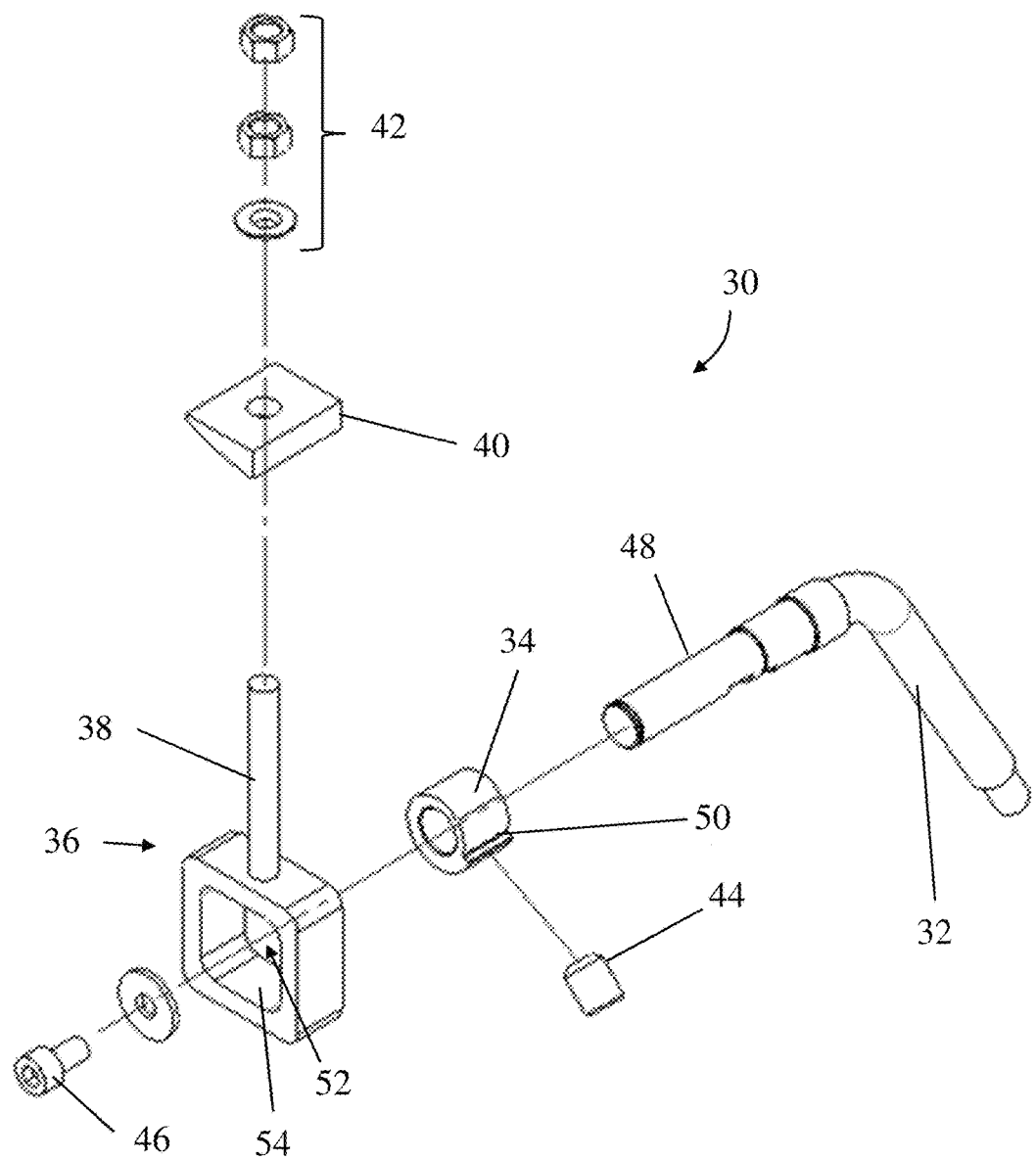
FIG. 4 is a partially exploded perspective view of one embodiment of a locking mechanism for a work table adjustment system.

As illustrated in FIG. 4 the cam 34 and tightening element 36 are constructed and arranged such that rotation of the cam within the opening 52 causes the cam to engage a camming surface 54 of the tightening element, thereby driving displacement of the tightening element relative to the camshaft to move the locking mechanism between an unlocked configuration and a locking configuration. In particular, the cam is shaped as an eccentric cylinder, with a bore of the cam through which the camshaft passes being offset from the center of the cylinder. However, cams with other shapes also may be suitable, as the disclosure is not limited to any particular shape for the cam 34. Further, in the depicted embodiment, the camming surface 54 is generally flat, though other shapes or configurations for the camming surface, such as a curved camming surface with a concave or convex curvature, are also contemplated. As the locking mechanism moves from the unlocked configuration towards the locking configuration, the engagement between the cam 34 and the camming surface 54 pushes the tightening element 36 downward, away from the work table 16 and the tilt-adjustment mechanism 18. As discussed above, this downward movement of the tightening element pulls the tightening block 40 downward and presses the trunnions 20 and 22 against one another, thereby creating a frictional engagement that locks the tilt-adjustment mechanism 18 in a desired configuration.

In some instances, the cam 34 may include a locking feature such as a flat 50 that defines the locking configuration of the locking mechanism. In particular, the flat may be positioned on the surface of the cam 34 at a position corresponding to a maximum displacement of the cam relative to the camshaft, though other positions along the surface of the cam also may be suitable. Further, the flat 50 may be configured to provide a stable engagement between the cam 34 and the camming surface 54 such that the locking mechanism remains in the locking configuration once an operator moves the locking mechanism from the unlocked configuration to the locking configuration. For example, the flat 50 may have a flat surface area that engages with the flat camming surface 54 to provide a stable interaction that maintains the cam in the locking configuration. Although a cam with a flat is described above, it should be understood that other configurations may be suitable to define a locking configuration. For example, the cam 34 may include a ridge, step, or other protrusion, or the outer surface of the cam may be otherwise shaped such that the locking mechanism may be moved into a stable configuration to define the locking configuration. In some embodiments, the cam 34 and the camming surface 54 may configured such that the camming force between the cam and the camming surface decreases slightly when the locking mechanism is moved to the locking configuration and the locking feature, such as flat 50, engages with the camming surface 54. In this manner the cam 34 may "cam over" when moved into the locking configuration, and the locking mechanism may require an operator to apply an increased force to locking mechanism to overcome the locking engagement of the locking feature and the camming surface in order to move the locking mechanism out of the locking configuration. Such a configuration may further aid in retaining the locking mechanism in the locking configuration.

Further, in certain embodiments, the cam 34 may be secured to the camshaft 48 via a set screw 44, which may be selectively loosened to allow adjustment of the orientation of the cam relative to the camshaft. In this manner, the total displacement provided by the interaction between the cam and the camming surface 54 may be adjusted, thereby allowing the locking force provided by the locking mechanism may be adjusted.

Having described various components of a work table adjustment system, its method of operation is now described in more detail. When a tilt adjustment of the work table 16 is desired, an operator may manipulate the locking handle 32 to move the locking mechanism 30 from the locking configuration to the unlocked configuration. As noted above, when in the locking mechanism is in the unlocked configuration, the operator may be free to adjust the tilt angle of the work table via the tilt-adjustment mechanism 18. Once the work table is adjusted to the desired configuration, the operator may secure the work table in place by manipulating the locking handle to move the locking mechanism back to the locking configuration. In particular, the locking handle 32 may be manipulated by the operator to rotate the camshaft 48, and consequently the cam 34, relative to the tightening element 36. The rotation of the cam drives the displacement of the tightening element away from the tilt-adjustment mechanism 18, which pulls the tightening block 40 against the tilt adjustment mechanism to create a strong frictional engagement. When the locking mechanism is moved fully into the locking configuration, the flat 50 is moved into engagement with the camming surface 54 on the tightening element to retain the locking mechanism in the locking configuration.

As noted above, the locking handle 32 may act as a lever to provide a mechanical advantage when moving the locking mechanism between the locking and unlocked configurations. In this manner, the locking mechanism may achieve a high locking strength while still maintaining a tool-free operation. In other embodiments, the locking handle may be coupled to the cam via one or more gears or a transmission to provide a desired mechanical advantage. In further, embodiments, the locking mechanism may not require a mechanical advantage to be moved between the unlocked and locking configurations. Accordingly, it should be understood that the current disclosure is not limited to any particular configuration between the locking handle and the cam of the locking mechanism, and a locking system may, or may not, provide a mechanical advantage.

Further, although a cam positioned on a rotating camshaft is described above, it should be understood that other arrangements also may be suitable, as the current disclosure is not limited in this regard. For example, the locking mechanism may include displaceable camming elements, or a combination of rotating and displacing camming elements that are constructed and arranged to move the locking mechanism between the unlocked and locking configurations.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A work table adjustment system comprising:
    a tilt-adjustment mechanism that rotatably attaches a work table to a housing; and
    a locking mechanism comprising a rotatable cam and a tightening element, the locking mechanism movable between an unlocked configuration and a locking configuration, wherein the locking mechanism substantially restricts adjustment of the tilt-adjustment mechanism when the locking mechanism is in the locking configuration, wherein rotating the cam about a first axis applies tension to the tightening element along a second axis, the second axis perpendicular to the first axis, wherein applying tension to the tightening element moves the locking mechanism from the unlocked configuration to the locking configuration, wherein the tightening element includes a camming surface that engages the rotatable cam and wherein the camming surface is disposed within an opening of the tightening element.

2. The work table adjustment system of claim 1, wherein the tilt-adjustment mechanism comprises a first trunnion attached to the housing and a second trunnion attached to the work table.

3. The work table adjustment system of claim 1, wherein the tilt-adjustment mechanism comprises a rack attached to the work table and a pinion attached to the housing.

4. The work table adjustment system of claim 1, wherein the rotatable cam includes at least one locking feature that defines the locking configuration.

5. The work table adjustment system of claim 4, wherein the at least one locking feature includes at least one of a flat, a ridge, and a protrusion on the surface of the cam.

6. The work table adjustment system of claim 1, further comprising a handle coupled to the cam.

7. The work table adjustment system of claim 6, wherein the handle is constructed and arranged to provide a mechanical advantage to the cam.

8. The work table adjustment system of claim 1 in combination with a band saw.

9. A work table adjustment system for a band saw, comprising:
    a tilt-adjustment mechanism comprising:
        a first adjustment element attached to a housing of the bandsaw; and
        a second adjustment element attached to a work table and movable relative to the first adjustment element, wherein moving the second adjustment element relative to the first adjustment element rotates the work table relative to the housing; and
    a locking mechanism operatively coupled to the tilt-adjustment mechanism, the locking mechanism movable between a locking configuration and an unlocked configuration, wherein the locking mechanism substantially restricts movement of the tilt-adjustment mechanism when the locking mechanism is in the locking configuration, the locking mechanism comprising:
        a tightening element displaceable relative to the housing, the tightening element operatively coupled to the tilt-adjustment mechanism; and
        a cam movable relative to the tightening element, wherein moving the cam relative to the tightening element displaces the tightening element relative to the housing to move the locking mechanism to the locking configuration, wherein the tightening element includes a camming surface that engages the cam and wherein the camming surface is disposed within an opening of the tightening element, and wherein the cam is rotatable within the opening.

10. The work table adjustment system of claim 9, wherein the first adjustment element is a first trunnion and the second adjustment element is a second trunnion.

11. The work table adjustment system of claim 10, wherein the second trunnion is slidable relative to the first trunnion along a curved interface.

12. The work table adjustment system of claim 9, wherein the first adjustment element is a pinion attached to the housing and the second adjustment element is a curved rack attached to the work table that engages the pinion.

13. The work table adjustment system of claim 12, further comprising a knob coupled to the pinion, wherein rotating the knob rotates the pinion.

14. The work table adjustment system of claim 9, wherein moving the locking mechanism to the locking configuration creates a frictional engagement between the first and second adjustment elements.

15. The work table adjustment system of claim 9, wherein the cam is rotatable relative to the tightening element about a first axis, and wherein rotating the cam about the first axis displaces the tightening element along a second axis, the second axis perpendicular to the first axis.

16. The work table adjustment system of claim 9, wherein the cam includes at least one locking feature that defines the locking configuration.

17. The work table adjustment system of claim 16, wherein the at least one locking feature includes at least one of a flat, a ridge, and a protrusion on the surface of the cam.

18. The work table adjustment system of claim 9, further comprising a handle coupled to the cam.

19. The work table adjustment system of claim 18, wherein the handle is constructed and arranged to provide a mechanical advantage to the cam.

20. The work table adjustment system of claim 9, in combination with the band saw.

* * * * *

UNITED STATES PATENT AND TRADEMARK OFFICE
CERTIFICATE OF CORRECTION

| | | |
|---|---|---|
| PATENT NO. | : 10,029,323 B2 | Page 1 of 1 |
| APPLICATION NO. | : 15/161149 | |
| DATED | : July 24, 2018 | |
| INVENTOR(S) | : Wuzheng Duan et al. | |

It is certified that error appears in the above-identified patent and that said Letters Patent is hereby corrected as shown below:

On the Title Page

(73) Assignee should read:
Rikon Power Tools, Inc.
Billerica, MA (US)

Signed and Sealed this
Twenty-second Day of January, 2019

Andrei Iancu
*Director of the United States Patent and Trademark Office*